US009401881B2

(12) United States Patent
Isensee et al.

(10) Patent No.: US 9,401,881 B2
(45) Date of Patent: Jul. 26, 2016

(54) AUTOMATIC QUESTION GENERATION AND ANSWERING BASED ON MONITORED MESSAGING SESSIONS

(71) Applicant: International Business Machines Corporation, Armonk, NY (US)

(72) Inventors: Scott H. Isensee, Austin, TX (US); William G. O'Keeffe, Tewksbury, MA (US); David R. Schwartz, Bellevue, WA (US); Cale R. Vardy, East York (CA)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 14/037,470

(22) Filed: Sep. 26, 2013

(65) Prior Publication Data
US 2015/0088998 A1    Mar. 26, 2015

(51) Int. Cl.
*G06F 15/16* (2006.01)
*H04L 12/58* (2006.01)

(52) U.S. Cl.
CPC .......... *H04L 51/02* (2013.01); *H04L 51/16* (2013.01)

(58) Field of Classification Search
CPC ....... H04L 51/06; H04L 51/046; H04L 51/02; H04L 51/16; H04L 12/58
USPC ............................................ 709/206
See application file for complete search history.

(56) References Cited

U.S. PATENT DOCUMENTS

| 9,657,881 | | 9/2009 | Marks | |
|---|---|---|---|---|
| 8,930,465 | B2* | 1/2015 | Jaffer | 709/202 |
| 9,053,146 | B1* | 6/2015 | Kapoor | G06F 17/30389 |
| 9,098,509 | B1* | 8/2015 | Kapoor | G06F 17/30023 |
| 2006/0047615 | A1* | 3/2006 | Ravin | G06N 5/022 706/50 |
| 2007/0218448 | A1 | 9/2007 | Harmeyer et al. | |
| 2008/0046512 | A1* | 2/2008 | Jones | G06Q 10/107 709/204 |
| 2009/0083380 | A1* | 3/2009 | Smyth | H04L 12/581 709/206 |
| 2009/0119371 | A1* | 5/2009 | Chang | H04L 12/1827 709/206 |
| 2009/0287678 | A1 | 11/2009 | Brown et al. | |
| 2011/0055207 | A1* | 3/2011 | Schorzman | G06F 17/30699 707/723 |
| 2011/0125734 | A1 | 5/2011 | Duboue et al. | |
| 2011/0213642 | A1* | 9/2011 | Makar | G06F 17/2785 705/7.38 |

(Continued)

OTHER PUBLICATIONS

High, Rob, "The Era of Cognitive Systems: An Inside Look at IBM Watson and How it Works", IBM Corporation, Redbooks, 2012, 16 pages.

(Continued)

*Primary Examiner* — Anthony Mejia
(74) *Attorney, Agent, or Firm* — Stephen J. Walder, Jr.; Reza Sarbakhsh

(57) ABSTRACT

Mechanisms are provided, in a first computing device, for sharing content of communication sessions. The mechanisms establish a first communication session between the first computing device and a second computing device. The first computing device is operated by a first user and the second computing device is operated by a second user. The apparatus establishes, in response to content of the first communication session indicating subject matter for which additional information is desired by at least one of the first user or the second user, a second communication session between the first computing device and a question and answer (QA) system. In response to an input by the first user requesting sharing of information, the first computing device automatically copies a portion of content of the first communication session to the second communication session as an input question submitted to the QA system.

16 Claims, 7 Drawing Sheets

(56) References Cited

U.S. PATENT DOCUMENTS

| | | | |
|---|---|---|---|
| 2012/0150973 A1* | 6/2012 | Barak | G06Q 30/0609 709/206 |
| 2012/0272164 A1 | 10/2012 | Polonsky et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0129076 A1* | 5/2013 | Kannan | H04M 3/5175 379/265.09 |
| 2013/0212497 A1* | 8/2013 | Zelenko | G06F 17/30867 715/760 |
| 2014/0115466 A1* | 4/2014 | Barak | G06F 9/4443 715/716 |
| 2014/0119531 A1* | 5/2014 | Tuchman | H04M 3/5166 379/265.09 |
| 2014/0188991 A1* | 7/2014 | Dhara | H04L 67/306 709/204 |
| 2015/0163358 A1* | 6/2015 | Klemm | G06Q 30/01 379/88.01 |

OTHER PUBLICATIONS

Yuan, Michael J., "Watson and healthcare, How natural language processing and semantic search could revolutionize clinical decision support", IBM developerWorks, IBM Corporation, Apr. 12, 2011, 14 pages.

* cited by examiner

AUTOMATIC QUESTION GENERATION AND ANSWERING BASED ON MONITORED MESSAGING SESSIONS

BACKGROUND

The present application relates generally to an improved data processing apparatus and method and more specifically to mechanisms for automatically generating questions and obtaining answers for such automatically generated questions via a Question and Answer (QA) system, based on the monitoring of one or more related messaging sessions.

With the ever increasing proliferation of electronic communication systems in today's society, tasks are more often requiring that a user interface with other parties via these electronic communication systems in order to rectify problems or obtain information quickly. For example, instant messaging, chat sessions, texting, and the like, are increasingly being used as a basis for users to communicate with parties in order to complete a task, e.g., problem resolution or the like. In some cases, the user may operate as an intermediary between two or more other parties with which the user has separate communication sessions and which are not aware of each other.

For example, a customer service representative, the "user" in this case, may have a first chat session established with a customer over a first communication link in order to assist the customer with a problem the customer is encountering. The customer service representative (CSR) may need to contact a subject matter expert, such as a technician or the like, in a second chat session, or access a database via an automated mechanism, to obtain additional information to assist the CSR in assisting the customer. As such, the CSR, as an intermediary, is tasked with having to manually share the information exchanged in one chat session with a first party (e.g., the customer) with a second party (e.g., the subject matter expert) in a second communication connection, e.g., second chat session. As such, the user must manually enter the information gathered from one chat session into the other, e.g., by typing the information in, performing a copy/paste operation or the like.

In addition, there are times when a user may be involved in an electronic communication conversation with a party and information is exchanged that the user does not recognize as being information pertinent to solving the problems experienced by the party or information for which additional information is available that may be helpful in solving the problems experienced by the party. For example, a customer may offhandedly mention that they are using a particular operating system and the user, e.g., the CSR, may not realize that this operating system, combined with other factors, may be a root cause of the problem and a simple, yet obscure, solution may be available. As a result, much time and effort may be expended trying to solve the party's problem which could have been avoided if the availability of additional information or the importance of the supplied information were recognized by the user.

SUMMARY

In one illustrative embodiment, a method, in a first computing device comprising a processor and a memory, for sharing content of one communication session with another communication session. The method comprises establishing, by the first computing device, a first communication session between the first computing device and a second computing device. The first computing device is operated by a first user and the second computing device is operated by a second user. The method further comprises establishing, by the first computing device, in response to content of the first communication session indicating subject matter for which additional information is desired by at least one of the first user or the second user, a second communication session between the first computing device and a question and answer (QA) system. The method also comprises, in response to an input by the first user to the first computing device requesting sharing of information of the first communication session with the second communication session, automatically copying, by the first computing device, a portion of content of the first communication session to the second communication session as an input question submitted to the QA system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
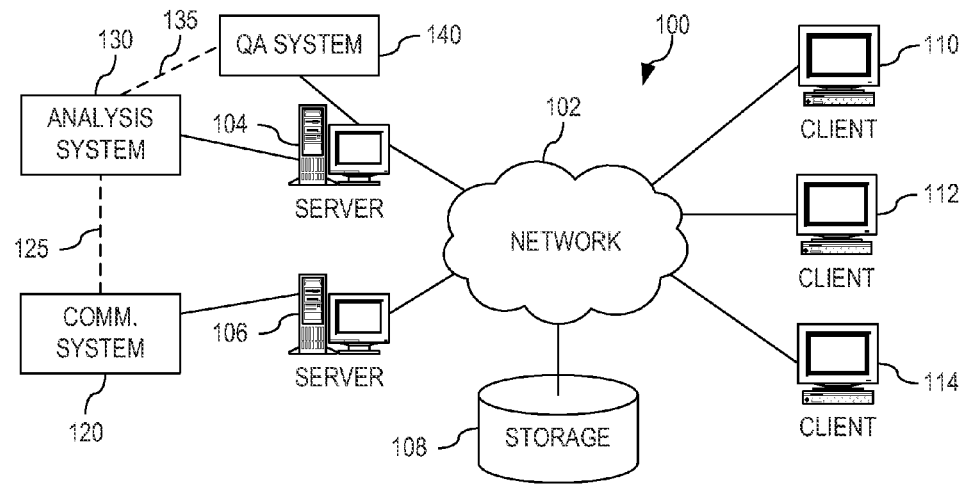
FIG. 1 is an example diagram of a distributed data processing system in which aspects of the illustrative embodiments may be implemented.

The illustrative embodiments provide mechanisms for automatically generating questions and obtaining answers for such automatically generated questions via a Question and Answer (QA) system, based on the monitoring of one or more related messaging sessions. The mechanisms of the illustrative embodiments may automatically monitor the content and contexts of one or more communication sessions, e.g., chat sessions, instant messaging sessions, voice communications, or the like, and determine, using a QA system or other natural language processing (NLP) based system, whether additional information is available for assisting in the handling of the issues, problems, situations, or the like, raised or identified in the communication session. In addition, mechanisms are provided for automatically sharing information exchanged in one communication session with another communication session without requiring a user to manually enter or copy/paste the information from one communication session to another.

In one illustrative embodiment, the present invention provides a communication session interface that comprises a first portion for conducting a communication session with a first party, such as via a chat or instant messaging mechanism. Text of the communication session may be managed and displayed via this first portion such that the user and another party may communicate, a log of the communications may be maintained, and the like, as is generally known in the art. In addition to this first portion of the communication session interface, a second portion is provided for conducting a second communication session with a second party, which may be another human being or an automated system. In one illustrative embodiment, this second communication session is conducted with a NLP based system, such as a QA system. In one illustrative embodiment, this QA system may be the Watson™ QA system available from International Business Machines (IBM) Corporation of Armonk, N.Y.

Information from the first communication session may be extracted and automatically inserted into the second communication session to generate one or more inputs for processing by the NLP based system, e.g., questions to be submitted to the QA system. The NLP based system may process these inputs and return results of this processing to the user for use in assisting the user with the first communication session. For example, content and context of the first communication session may be analyzed to generate one or more questions that may be submitted to the QA system via the second communication session. The "context" comprises information extracted and correlated from multiple communications within a same communication session as well as information regarding the establishment of the communication session, the parties involved in the communication session, and the like. The context may further comprise information about the parties known to the communication systems being used, the NLP or QA system, or the like. For example, such information may include information about the type of computing device or communication device being used by the parties, a party's service plan, pricing information, usage information, or the like. Any other information that may be used to discern the context of a communication session, and which may be used to determine if other sources of information to assist with the communication session exist, may be included in the scope of the "context" information that may be gathered and analyzed by the mechanisms of the illustrative embodiments depending on the particular implementation desired.

The questions may be automatically inserted into the second communication session via the second portion of the interface. Results generated by the QA system, such as answers to the inserted questions, their corresponding confidence ratings, and the like, may be returned to the user via the second portion or another results portion of the interface. The user may then utilize these answers to assist in solving the issues, problems, or the like, identified in the first communication session. Moreover, mechanisms may be provided to automatically extract the results information, or portions thereof, returned by the NLP or QA system and inset the extracted results information into the first communication session.

In this way, mechanisms are provided for automatically assisting a user in responding to assistance requests in a first communication session with another party. The mechanisms of the illustrative embodiments facilitate additional communication sessions being established and providing automated mechanisms for sharing the content of one communication session with another. In addition, mechanisms are provided for enlisting the assistance of NLP and/or QA systems to assist in the communications between the user and other parties either as a foreground or background process.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing.

In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
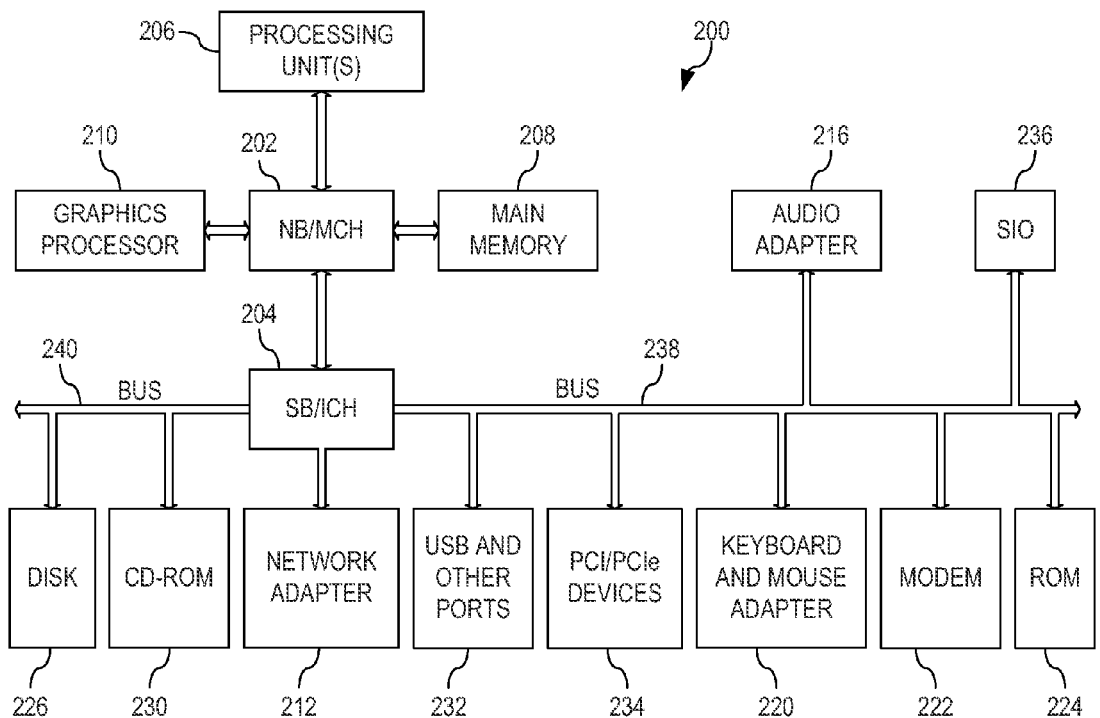
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Referring again to FIG. 1, in accordance with the illustrative embodiments, one or more of the servers 104, 106 may provide a functionality for facilitating communication sessions between users of client computing devices 110, 112, and 114. This is depicted in FIG. 1 as the communication system 120 coupled to server 106. The communications may be text-based communications, such as short message service (SMS) messaging, instant messaging, chat messaging, electronic mail communications, or the like. These communications may also take other forms including voice communications which may be converted to a textual equivalent using speech recognition mechanisms, or the like. For purposes of the running example used in this description, the communications will be assumed to be text based instant messaging communications. However, it again should be appreciated that this is only an example and other types of communications can be used with the mechanisms of the illustrative embodiments without departing from the spirit and scope of the present invention.

In the present description, an example scenario comprising a first party communicating with a user of the illustrative embodiments of the present invention for purposes of solving a problem encountered by the first party. This is a typical scenario that may be encountered by a customer service representative (CSR) of an organization attempting to assist a customer with the problem that the customer is encountering with a product or service provided by the organization. This scenario will be used only as an example for illustrating the advanced functionality of the illustrative embodiments as is not intended to be limiting on the illustrative embodiments of the present invention. To the contrary, the illustrative embodiments may be used with any communication between parties and the user, as will be readily apparent to those of ordinary skill in the art in view of the present description.

Thus, as an example scenario, consider a user of the client computing device 110 logging onto, calling into, or otherwise connecting to the communication system 120 hosted by the server 106, via network 102, to initiate a communication session with a user of client computing device 114 via the communication system 120. That is, for example, many product/service providers have associated Internet web sites through which support for their products/services may be obtained through a live chat session with a customer service representative (CSR). In such a scenario, a user of the client computing device 110 may log onto the website for the provider and select to engage in a live chat session with a CSR via the website which hosts an instance of the communication system 120 by virtue of being hosted by the server 106 or otherwise associated with server 106, although the website itself may be hosted by another computing device coupled to network 102. The user of client computing device 100 will be referred to as the "customer" in this scenario with the user of the client computing device 114 being the CSR or "user" of the mechanisms of the illustrative embodiments. Through the communication session established via the communication system 120 of server 106, the customer may send instant messages, or "chats," to the CSR regarding a problem or question that the customer needs to have resolved. In addition, the CSR may send instant messages, or "chats," back to the customer via the communication session in an attempt to assist the customer with the resolution of the problem or question that the customer needs to have resolved. The establishment of such communication sessions and the exchange of instant messages via such communication sessions is generally known in the art and thus, a more detailed explanation of the mechanics behind the establishment of such communication sessions and the exchange of messages is not provided herein.

In accordance with the illustrative embodiments, the communication system 120 may further implement an interface 125 for communicating with an analysis engine 130 to assist in communications exchanged between the customer and CSR via the communication session established through the communication system 120. The analysis system 130 may be provided on the same computing device, e.g., server 106, as the communication system 120 or on a separate computing device, e.g., server 104 as depicted. The analysis system 130 may be integrated with the communication system 120 or may be separate from the communication system 120, as depicted. The interface 125 provides a communication pathway for control/data messages between the communication system 120 and the analysis system 125. This interface may cause control/data messages to be exchanged between the systems 120 and 130 via the network 102, for example.

The analysis system 130 performs analysis on the content and context of the communications exchanged via a communication session established by the communication system 120 between two or more parties, e.g., the customer and the CSR. The analysis may be performed as a background operation with regard to the communications being exchanged by the CSR with the customer or may be a foreground operation that is known to the CSR and/or specifically requested by the CSR. For example, in one illustrative embodiment, when a communication session is created between a user of one client device and a user of another client device via the communication system 120, the registration of the communication session may cause a notification to be sent to the analysis system 130 indicating the configuration information for the communication session and thereby requesting the analysis system 130 to automatically monitor the content and context of the communications exchanged as part of that communication session. The analysis system 130 may automatically generate any necessary internal data structures needed to perform the monitoring and subsequent analysis of the communications and may perform its operations in the background without the performance of these functions being readily perceived by the users of the client devices until such time as the analysis system determines that a notification that it has additional information pertinent to the communications should be sent to one or more of the users. The analysis system 130 may then collect information about the communications exchanged as part of the communication session, analyze them, perform natural language processing and/or question and answer processing operations based on the information collected, and generate results which may be used to generate alerts and provide additional information pertinent to the communications. These alerts and additional pertinent information may be sent to the communication system 120 for presentation to one or more of the parties, or users, involved in the communication session.

For example, in response to a communication session being established between two users of client computing devices, e.g., a customer and customer support representative, the analysis system 130 is informed of the establishment of the communication session, generates its own internal data structures for monitoring and analyzing the content/context of the communications, and begins monitoring the communications. For example, the communications may be analyzed to extract various natural language processing features, e.g., focus, lexical answer type (LAT), subject, verbs, prepositional phrases, and various other types of natural language processing features. This information may be used to automatically generate questions to be posed to a question and answer (QA) system 140, such as the Watson™ QA system previously mentioned above. The questions are processed by the QA system 140 to generate one or more candidate answers to the posed questions. The QA system 140 returns the one or more candidate answers along with measures of their confidence to the analysis system 130 which determines is a required level of confidence is met by any of the one or more candidate answers. If not, the analysis system 130 continues to monitor and analyze the communications and submit questions to the QA system 140 until one or more candidate answers are returned that do meet the requisite level of confidence. Monitoring and analysis of the communications may continue even after such candidate answers with the requisite level of confidence are found so that additional candidate answers may be identified.

In response to one or more of the candidate answers having a confidence measure that meets or exceeds the requisite level of confidence, the analysis system 130 may generate an alert that is sent to the communication system 120. The communication system 120 may then generate a message corresponding to the alert that is sent to one or more of the parties involved in the communication session. For example, the communication system 120 may send an alert to the CSR that the QA system 140 found additional pertinent information that may be helpful to the CSR in resolving the problems or issues raised by the customer during the communication session. The alert message may contain the additional information obtained from the results generated by the QA system or may provide an interface through which the CSR may select whether or not to receive the additional information. Either if the alert message contains the additional information, or if the CSR selects via the interface to receive the additional information, the additional information generated from the one or more candidate answers having a requisite level of confidence is presented to the CSR for consideration. In such a case, the additional information may include not only the candidate answer(s) having the requisite level of confidence but may also include information about the question(s) posed to the QA system that generated the candidate answer(s).

In one illustrative embodiment, if the QA system does not generate any candidate answers having a sufficiently high confidence measure, i.e. a confidence measure meeting or exceeding the predetermined requisite confidence measure, then a third party analysis service may be invoked automatically to assist or a user selectable option may be output to the CSR to request whether the CSR wants to invoke the assistance of a third party analysis service. For example, if the QA system does not generate a sufficiently confident measure for a candidate answer, the CSR may request the assistance of a third party service, such as a search engine or the like, to assist with finding answers to the question.

As an example, consider a scenario where a customer asks a question a part of a communication session with a CSR and the CSR does not know the answer to the question and submits the question to the QA system. If the QA system does not know the answer, i.e. cannot generate a candidate answer with sufficient confidence measure, an Internet search for the may be initiated using the input question as a basis for the search, the question may be submitted to a forum for other users to respond to, or another third party mechanism may be invoked to search for the answer for the input question. The invoking of the third party mechanism may be performed automatically with the input question passed automatically to this third party mechanism. The output of the third party mechanism may be returned to the QA system and may be used as further information to assist in the QA system generating an answer, e.g., as additional corpus content, as additional evidence passages, or the like.

In some illustrative embodiments, a user interface option may be presented to allow the CSR to initiate the automatic insertion of the additional information into the communication session between the CSR and the customer. Moreover, if more than one candidate answer is identified that has a requisite level of confidence, then interface options may be provided for allowing the CSR to select which candidate answer(s) and corresponding question(s) to include in the automatic insertion. Thus, the CSR may identify which of the candidate answer(s) is the most relevant to the communication session.

Alternatively, rather than performing such monitoring and analysis automatically as a background operation until an alert is generated, the mechanisms of the illustrative embodiments may be user driven such that one or more of the users involved in the communication session must request the assistance of the analysis system 130. For example, the communication system 120, in generating user interfaces to be rendered at the client computing devices 110, 114, and through which the communications are presented to the users involved in the communication session, may generate user interface elements for requesting the assistance of the analysis system 130, e.g., a user selectable virtual button or the like. In such a case, in response to a user selecting the user interface element, the functionality described above may be initiated by the analysis system 130. Thus, if the CSR is able to handle the customer's request for assistance, then the functionality of the analysis system 130 may not be invoked. However, if the CSR determines that additional assistance is needed to satisfactorily handle the customer's request for assistance, then the CSR is given the option to enlist the help of the analysis system 130.

In one illustrative embodiment, the analysis performed by the analysis system 120 may comprise implementing logic for identifying content or context within the communications indicative of a need to involve one or more other persons in the communications, e.g., a subject matter expert, supervisory personnel, or the like. As a result, the analysis system 130 may automatically generate a request that is sent to the communication system 120 to initiate a communication session with the other identified person(s) that should be included in the communications of the first communication session.

For example, assume that a user of client computing device 110, the "customer," contacts the customer service support for a provider of a product via a website hosted by server 106, and initiates a communication session with a customer service representative (CSR) via the communication system 120. Either automatically, or at the request of the CSR, for example, the analysis system 130 may monitor the content and context of the communications between the customer and the CSR and identifies a trend within the context of the communications exchanged that the customer is frustrated with the response being received and as a result, may automatically initiate a communication session with a supervisor of the CSR. This communication session may be between the supervisor and the CSR, between the supervisor and the customer, or a three-way communication session. In this way, the severity of the customer's problems or issues may be automatically elevated to a supervisory level. This process can be repeated up to a desired level of a hierarchy such that additional communication sessions may be initiated when appropriate.

As another example, the analysis system 130 may analyze the content and context of the communications and determine that the communications reference a particular product and particular problem and that the CSR has not adequately responded to the customer's problem within a certain number of communications, certain amount of time since the communication session was established, or that there are other indicia of a need for additional assistance for the CSR. In such a case, a communication session may be automatically initiated between the CSR client computing device 114 and another client computing device 112 of a subject matter expert determined to be the appropriate subject matter expert for the particular product, problem, or the like. Alternatively, a message may be output to the CSR that requests whether the CSR would like to enlist the assistance of a subject matter expert and may identify a suggested subject matter expert and their credentials. The CSR may then select a user interface element for initiating a second communication session between the CSR and the subject matter expert or select a user interface element to decline the assistance of the subject matter expert. Moreover, the communication system 120 may further provide a user interface to the CSR with a user interface element for the CSR to specifically request that the analysis system 130 identify if a subject matter expert is available to assist the CSR, in which case the analysis system 130 may perform its monitoring and analysis functions to identify a subject matter expert that can assist the CSR.

The identification of a particular person with which to initiate a communication session may be performed using data structures correlating particular individuals with each other and/or with subject matter for which they are experts or generally responsible. For example, digital versions of organizational charts, personnel databases comprising information about personnel and their areas of expertise, and the like, may be used to identify which persons to initiate communication sessions with and the contact information for their computing devices so that appropriate communication sessions may be established via the communication system 120.

Content from one communication session may be automatically extracted and inserted into another communication session via the mechanisms of the illustrative embodiment. For example, if a second communication session is initiated with another party, e.g., supervisor, subject matter expert, or the like, content of the first communication session may be automatically copied into the second communication session and vice versa. This copying of content may be performed semi-automatically in that the user may select whether to copy content from one communication session into the other and may specify which portions of the content may be copied over. For example, a CSR may initiate a communication session with a subject matter expert and may automatically copy into the communication session with the subject matter expert, information provided by a customer in another communication session. When the subject matter expert responds with information that the CSR believes to be of value to the customer, the CSR may select an option to automatically copy the information from the second communication session into the first communication session between the CSR and the customer. For example, a user interface element may be output with each message, the most recent message, or the like, that gives an option to have the content of that message copied over into another communication session.

It should be appreciated that such copying over of information from one communication session to another is not limited to only communication sessions between users, but instead may also be used with a communication session established between the CSR and the analysis system 130. That is, when the analysis system 130 is invoked, either automatically or in response to the CSR's request, another communication session may be established between the CSR and the analysis system 130 via the communication system 120. The CSR may then select a user interface element associated with a message in a first communication session between a CSR and a customer to thereby copy the content of that message to the second communication session between the CSR and the analysis system 130. The analysis system may receive the message and process it, along with the context information for the first communication session, to generate one or more questions to be submitted to the QA system 140, for example. Results generated by the QA system 140 may be returned as a message in the second communication session with the CSR who may then select a user interface element associated with the result message to have the results automatically copied over into the first communication session between the CSR and the customer. Thus, an automated copy over functionality is provided.

Thus, the illustrative embodiments provide mechanisms for enabling the sharing of information and message content between concurrent communication sessions. Moreover, automatic or semi-automatic invocation of the assistance of an analysis system or other personnel is made available based on content and context analysis of communications exchanged as part of a communication session. In addition, automatic monitoring and analysis of communications is made possible as well such that the analysis system may operate as a virtual advisor to human users operating in the background and offering assistance when it is determined that the virtual advisory has pertinent information to the communications between the human users.

Figure 3:
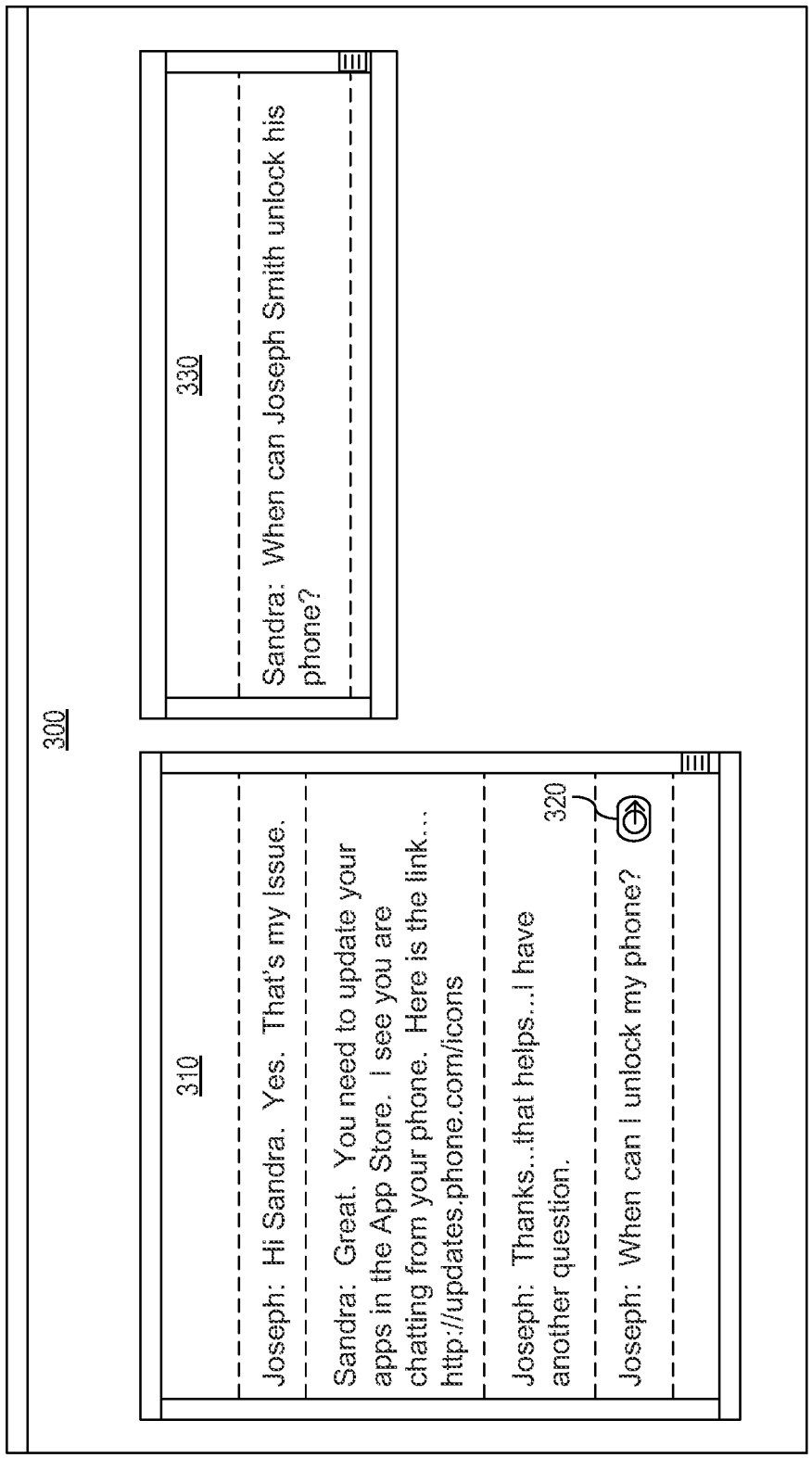
FIG. 3 is an example diagram illustrating a user interface for exchanging instant messages as part of a first communication session between a first human user and a second human user in accordance with one illustrative embodiment.

FIG. 3 is an example diagram illustrating a user interface for exchanging instant messages as part of a first communication session between a first human user and a second human user in accordance with one illustrative embodiment. As shown in FIG. 3, a first portion 310 of the user interface 300 is provided for displaying instant messages exchanged between a user and another party, e.g., a customer. In the depicted example, the user, Sandra, is a CSR and is communicating with a customer, Joseph, via the communication system 120 with the user interface 300 being displayed on the CSRs client computing device 116.

A user interface element 320 is provided for initiating a second communication session with either another human user, such as a subject matter expert, an automated analysis system, or the like. The user interface element 320 may be displayed as part of the user interface 300 initially, or in response to an analysis system monitoring the content and context of the communications of the first communication session and determining that a human user or automated analysis system may be able to assist the CSR with resolving issues raised in the communication or otherwise add value to the conversation being conducted as part of the first communication session. In the depicted example, the user interface element 320 is selectable by a user to initiate a second communication session with a question and answer (QA) system.

In response to the user, Sandra, selecting the user interface element 320, a request is sent to the communication system 120 to initiate a second communication session between the user, Sandra, client computing device and the QA system. The request may include an identification of the user's computing device, e.g., an address, device identifier, and/or the like, for purposes of establishing a communication connection as well as information about the first communication session to provide a context for generating and submitting questions to the QA system.

In selecting the user interface element 320, content of the message(s) may be automatically selected for copying to a second portion of the user interface 330 for communicating with the QA system. The analysis engine 130 may receive the selected communications and analyze the selected communications in conjunction with the context information for the first communication session to generate one or more questions to submit to the QA system.

For example, in the depicted example, the message "When can I unlock my phone?" is selected for copying from the first communication session to the second communication session. This message is provided to the analysis engine 130 along with context information for the first communication session which may include the user's name, e.g., Joseph Smith. The analysis engine 130 may analyze the message to identify the elements of the message as well as the context and may generate a question for submission to a QA system based on results of the analysis. For example, in the depicted example, the pronoun "I" in the message may be identified and replaced with the name "Joseph Smith" from the context of the first communication session to generate a question of "When can Joseph Smith unlock his phone?" This may be assist in providing answers to questions that are specific to Joseph Smith's account, e.g., whether he has a service contract, the terms of the service contract, etc.

Another example may be that the user submits the statement "my phone is locking up when I press the 'answer call' button." The mechanisms of the illustrative embodiments may replace 'phone' with 'Apple iPhone 5' and convert the statement to a question that is able to be submitted to a QA system, e.g., "Why is Joseph Smith's Apple iPhone 5 locking up when he presses the 'answer call' button?." The system, in this example, knows what device the user has from other data sources, such as user account data structures or the like, with the identification of the user coming from the metadata associated with the connection, user session, etc. This identification of the user's device may assist in providing a solution to the user's issue in that the answer to the user's question or request for assistance may vary by device.

The question(s) generated by the analysis engine 130 may be displayed in the second portion 330 of the user interface 300 for viewing by the user, Sandra. In addition, the generated question may be submitted to the QA system for processing. The QA system operates on a submitted question(s) and generates candidate answers based on the submitted questions. This generation of candidate answers to the question(s) involves performing an analysis of a corpus of information to find portions of content in the corpus of information that provide answers to the question(s). The corpus of information may comprise various sources of information including various databases, document collections, and the like. The corpus of information may further comprise customer database information which may be used to provide specific answers for answering questions for the specific user involved in the communications of the first communication session or the specific context of the communication session.

As mentioned above, the invocation of the functionality of the analysis engine may be based on a user input requesting assistance from the analysis engine or may be automatic/semi-automatic, such as in response to a background monitoring of the communications in a communication session and a determination that the analysis engine may be able to assist with or add value to the conversation being held in the communication session. Of course a combination of user initiated and automatic/semi-automatic invocation of the analysis engine may be used without departing from the spirit and scope of the illustrative embodiments or the present invention. With the automatic invocation of the analysis engine, the analysis engine may, as a background process, monitor communication sessions generated by the communication system and may automatically generate questions to be submitted to the QA system, receive candidate answers back as results of processing these questions by the QA system, and determine if the results have sufficient confidence to warrant providing the results to the user, e.g., the CSR. In such a case, the analysis engine may automatically return the results generated by the QA system by displaying those results in the second portion 330 of the user interface 300. Alternatively, in a semi-automatic embodiment, before displaying the results generated by the QA system, an alert message, user interface element, or the like, may be output via the user interface 300 to inform the user that assistance is available and to provide a means by which the user may enter an input specifying whether the user wishes to accept the assistance or not.

In a combination embodiment, the automatic/semi-automatic implementation may be utilized to provide results generated by a QA system automatically as a background process, but also providing a user interface element for allowing the user to request assistance from the analysis engine when desired. For example, a user interface element 320 may be provided to request assistance from the analysis system and if the analysis engine determines that assistance is available, i.e. a candidate answer has been returned by the QA system that has a predetermined threshold level of confidence, then the analysis engine may cause the user interface 300 to output results returned by the QA system. The results may be automatically inserted into the second portion 330 of the user interface 300, as depicted, or may be presented in a separate portion of the user interface 300 (not shown).

Figure 4:
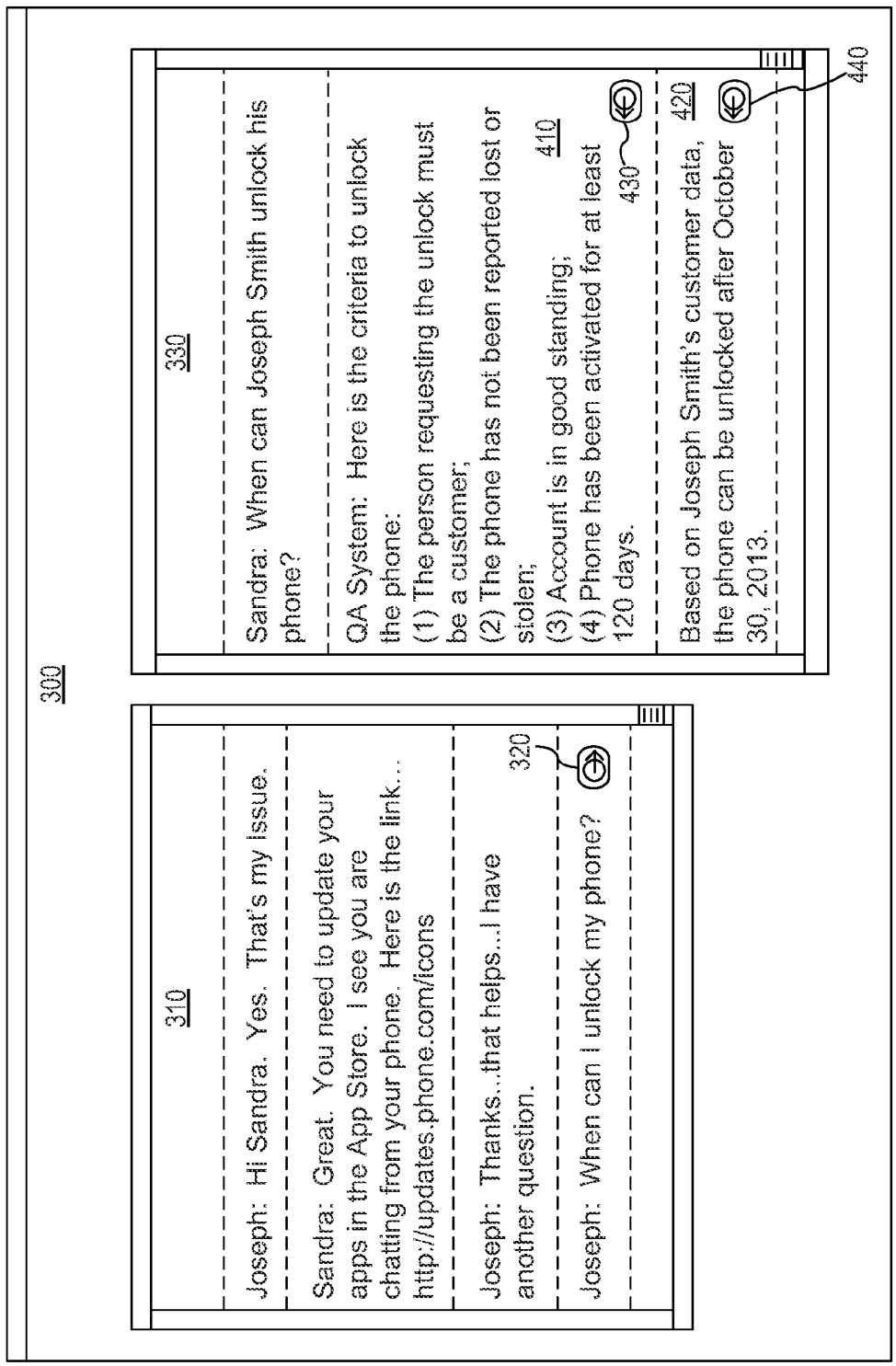
FIG. 4 is an example diagram illustrating a user interface in which candidate answers for a second communication session between a first human user and an automated analysis system are provided in accordance with one illustrative embodiment.

FIG. 4 is an example diagram illustrating a user interface in which candidate answers for a second communication session between a first human user and an automated analysis system are provided in accordance with one illustrative embodiment. As shown in FIG. 4, the question "When can I unlock my phone?" has been analyzed by the analysis engine, either automatically or in response to a user input requesting assistance by the analysis engine, and converted based on the context of the communications in the first communication session to a question of the type "When can Joseph Smith unlock his phone?" which is submitted to the QA system. As a result, the QA system processes the submitted question using a corpus of information pertinent to the question, as determined by analyzing the question, determining the focus of the question, lexical answer type (LAT), and the like, and generates the one or more candidate answers for the input question along with their corresponding confidence scores.

In the present case, a candidate answer 410 is generated and output via the second portion 330 of the user interface 300. The candidate answer may be used as a basis for generating an answer specific to the context of the communications in the first communication session depicted in the first portion 310 of the user interface 300. In this case, the customer database for customers of the organization for which the user works may be accessed by the analysis engine to correlate the candidate answer with specific information for the context of the first communication session. In the depicted example, the candidate answer 410 that is returned by the QA system answers the input question "When can Joseph Smith unlock his phone?" by stating that "Here is the criteria to unlock the phone: (1) the person requesting the unlock must be a customer; (2) the phone has not been reported lost or stolen; (3) account is in good standing; and (4) phone must have been active for at least 120 days." This candidate answer 410 may be correlated with information from the customer database to determine how this candidate answer 410 correlates with the specific context of the communications in the first communication session. This may include, in this example, comparing the criteria specified in the candidate answer 410 with data about the specific customer, i.e. Joseph Smith. For example, the customer database may be queried to determine whether Joseph Smith is a customer, whether Joseph Smith's phone has been reported lost or stolen, whether Joseph Smith's account is in good standing, and how long Joseph Smith's phone has been active. Based on this information, the candidate answer 410 may be used along with the correlation with context information to generate a context specific answer 420 that "Joseph Smith can unlock his phone on or after 30 Oct. 2013."

As shown in FIG. 4, in addition, a user interface element 430, 440 may be provided for sending the content of the second communication session with the analysis engine, as depicted in the second portion 330 of the user interface 300, to the first communication session between the user and the customer. If the user selects the user interface element 430, 440 then the context specific answer 420 and/or the candidate answer 410 may be automatically copied into the first communication session and transmitted to the customer as another message in the first communication session.

As mentioned above, the illustrative embodiments may further be utilized to identify other personnel with which a user may communicate to assist in the communications between the user and the customer, e.g., a subject matter expert or the like. For example, either automatically, semi-automatically, or in response to a user input requesting assistance, the analysis engine may determine a subject matter of the communications in the first communication session and perform a lookup of the subject matter in an employee database or other organizational database to identify one or more other persons that may assist in the communications as well as their contact information for initiating a communication session with these other persons. A user may select to initiate a second communication session with one or more of these other persons or such a second communication session may be automatically initiated. In such a case, similar mechanisms as described above in the user interface 300 may be used to share content of communications between communication sessions by copying the content over from one communication session to another either automatically or in response to a user input selecting to perform such a copy over operation. In this way, a user may maintain multiple concurrent communication sessions and share information and content of messages between these concurrent communication sessions.

Figure 5:
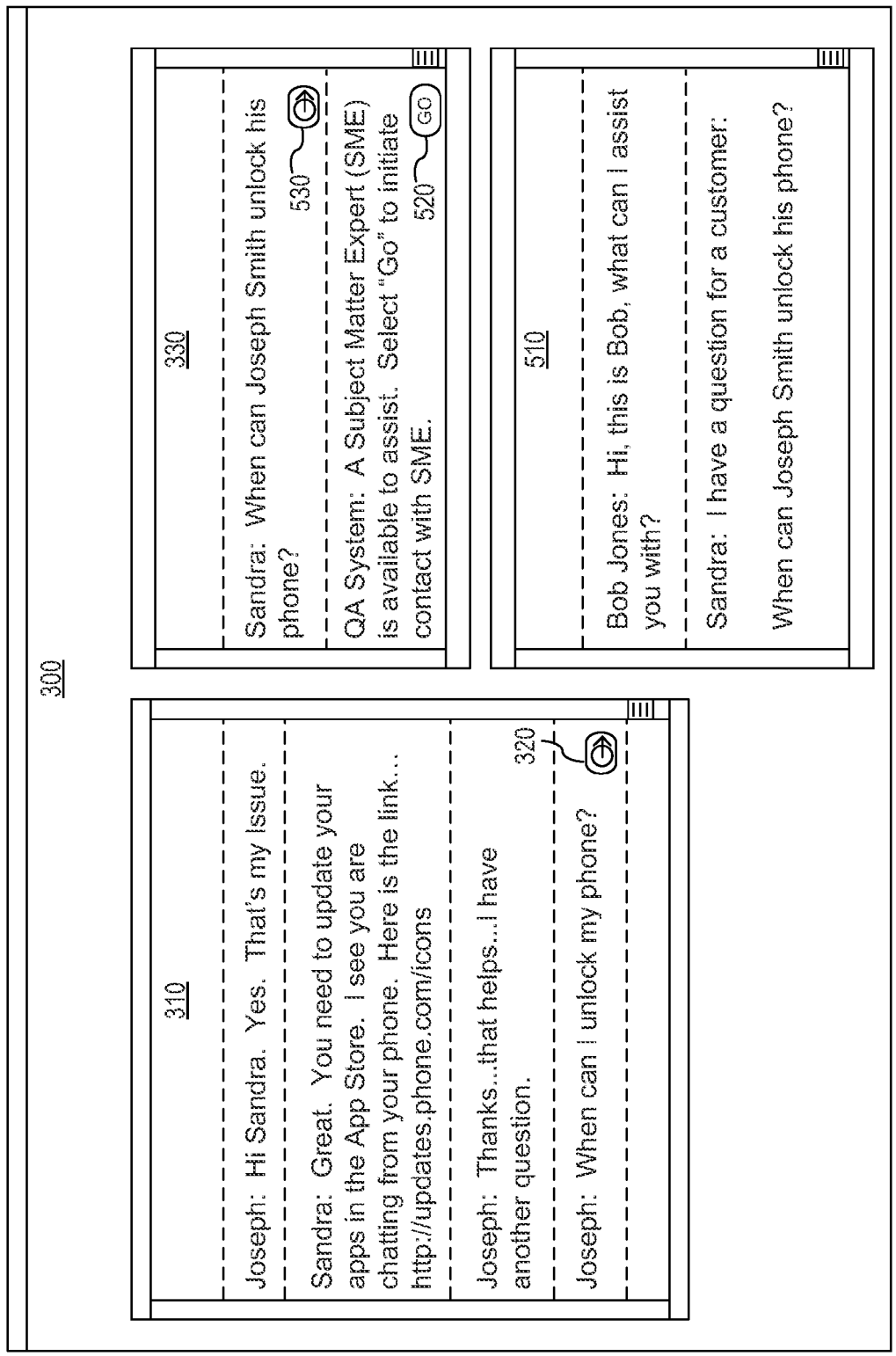
FIG. 5 is an example diagram illustrating a user interface for a communication session between a first human user and a third human user in accordance with one illustrative embodiment.

FIG. 5 is an example diagram illustrating a user interface for a communication session between a first human user and a third human user in accordance with one illustrative embodiment. In this case, the first human user, e.g., a customer service representative (CSR) may have already established a first communication session with a customer as depicted in the first portion 310 of the user interface 300. In addition, using one or more of the mechanisms described above in FIGS. 3 and/or 4, the user may have also initiated a second communication session, depicted in the second portion 330 of the user interface 300, with an analysis engine to request that the analysis engine provide assistance to the user in resolving issues or adding value to the communications being exchanged between the CSR and the customer in the first communication session. As part of the assistance offered by the analysis engine in the second communication session, the analysis engine may identify a third human user, e.g., a subject matter expert, that the analysis engine determines would provide value or assistance to the CSR in conducting the communications in the first communication session.

The identification of the third human user may be communicated to the CSR with a user selectable element 520 to initiate a third communication session with the identified third human user. Alternatively, the third communication session may be automatically initiated at the request of the analysis engine. The communication system may facilitate the creation of this third communication session in a similar manner as it was used to generate the first and second communication sessions. A third portion 510 of the user interface 300 may be generated for displaying messages exchanged between the CSR and the identified third human user as part of the third communication session. As with the other portions 310 and 330 of the user interface, user interface elements 530 may be provided for copying content of messages from one communication session to another. The particular communication session to which to copy the content may be specified in these user interface elements. In this way, content of any of the three communication sessions may be shared with any of the other communication sessions.

As described above, the illustrative embodiments provide mechanisms for collaboration and sharing of information in an automatic or semi-automatic manner between concurrent communication sessions with multiple persons and/or automated systems, such an automated analysis engine, QA system, NLP system, or the like. Moreover, the mechanisms of the illustrative embodiments provide for the monitoring of communications within a communication session and determining whether additional assistance is available from an analysis system, another human user, or the like. Mechanisms are provided for automatically generating input to such analysis systems and receiving results from such analysis systems which may then be automatically or semi-automatically shared between communication sessions. Thus, an advanced communication system is provided that enhances user experiences.

Figure 6:
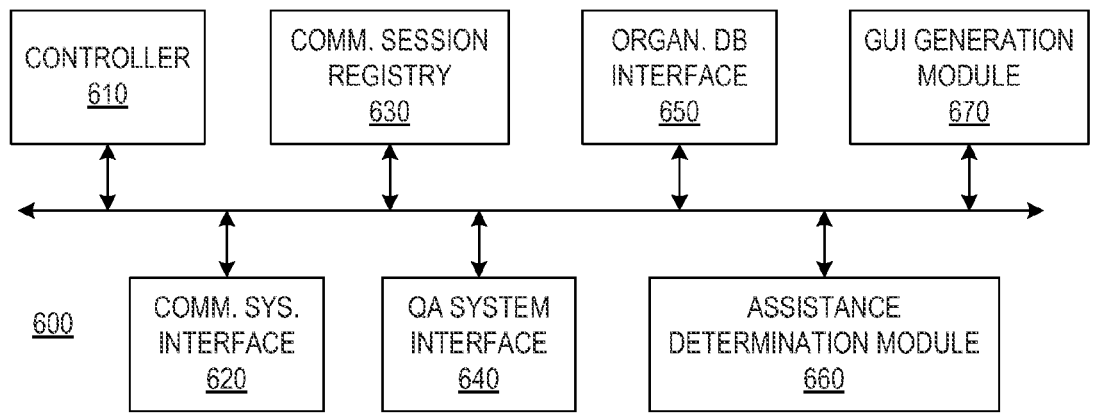
FIG. 6 is an example block diagram of an analysis system in accordance with one illustrative embodiment.

FIG. 6 is an example block diagram of an analysis system in accordance with one illustrative embodiment. The elements shown in FIG. 6 may be implemented in hardware, software, or any combination of hardware and software. In one illustrative embodiment, the elements of FIG. 6 are implemented as software instructions executed by one or more processors of one or more data processing systems and which may utilize additional storage, processing, and communication resources of these one or more data processing systems to perform the operations and provide the functionality described herein. For example, the elements in FIG. 6 may be implemented as software instructions executed by one or more processors of server 104 or 106.

As shown in FIG. 6, the analysis engine 600 comprises a controller 610, a communication system interface 620, a communication session registry database 630, a QA system interface 640, an organizational database interface 650, an assistance determination module 660, and a graphical user interface generation module 670. The controller 610 controls the overall operation of the analysis engine 600 and orchestrates the operation of the other elements of the analysis engine 600. The communication system interface 620 provides a communication pathway through which a the analysis engine 600 may send/receive data and control messages to/from the communication system, which is responsible for creating, maintaining, and tearing down communication sessions between computing devices. It is via this interface 620 that data/control messages are exchanged with the communication system to obtain communication session registry information, present user interfaces or portions of user interfaces to users for conducting communications and accessing additional assistance from analysis systems, such as the QA system, or other human users, such as subject matter experts. It is also via this interface 620 that user input to user interfaces from client computing devices may be received by the analysis engine via the communication system.

The communication session register database 630 stores information about the communication sessions established by the communication system and currently being maintained by the communication system. This information may include the context of the communication session, e.g., identifiers of parties involved, client computing devices, and the like. Moreover, this registry information may include information about whether a user has requested assistance from the analysis engine, whether the analysis engine has determined automatically that assistance is available for the communication session, a link to results generated by an analysis system, e.g., QA system, NLP system, or the like, links to other related communication sessions with which content of messages may be shared, and other types of information pertinent to the functionalities of analyzing communications of a communication session both based on content and context and providing assistance to a user for conducting communications as part of the communication session. The communication session registry database 630 is updated as communication sessions are created, additional analysis and related communication sessions are created, and communication sessions are torn down.

The QA system interface 640 provides a communication pathway for communicating data to/from a QA system. In particular, the controller 610 may receive content of communications and context information for a communication session via the communication system interface 620 and may generate one or more questions to be submitted to the QA system via the QA system interface 640. The QA system interface 640 may further receive results, e.g., candidate answers and corresponding confidence measures or scores, from the QA system and provide the results to the assistance determination module 660 for processing to provide assistance to a user via a user interface.

The organizational database interface 650 provides a communication pathway to one or more organizational data structures or databases comprising information about potential subject matter experts, hierarchical arrangements for identifying related personnel (e.g., supervisors or the like), or other individuals that may be capable of assisting in the communications being conducted between the user and a customer. The controller 610 may initiate a search of such organizational data structures to identify other individuals with which a related communication session should be created for communication between the user and the other identified individual to obtain assistance with the communication being conducted between the user and a customer in the first communication session. Such searches may be based on a determined subject matter, problem, issue, request, or the like, identified in the communications of the communication session, the context of the communication session, and the like.

The assistance determination module 660 provides logic for determining if assistance is available for a communication session, what that assistance may be, and communicating with the graphical user interface generation module 670 to generate one or more graphical user interfaces, or portions of graphical user interfaces, to present the assistance to a user. For example, the assistance determination module 660 may determine whether an appropriate other individual is identified through the search of the organizational data structures to provide assistance to the user. If so, a graphical user interface, graphical user interface element, or the like, is generated to inform the user of the availability of the assistance, if more than one individual is identified, a listing of available individuals from which to select, and provide an output of the communication session created between the user and the other identified individual. The assistance determination module 660 may further receive candidate answer results from the QA system and determine if the confidence measures or scores associated with the candidate answers meet or exceed a predetermined required threshold of confidence. If so, then the corresponding candidate answers may be presented via a graphical user interface generated by the graphical user interface generation module 670 either automatically or in response to a user selecting a presented user interface element informing the user of the availability of QA system assistance. It should be appreciated that the controller 610 may modify candidate answers to make them specific to the context of the communication session between the user and the customer as previously described above, and this specific candidate answer may be output via the graphical user interface generated by the module 670.

Figure 7:
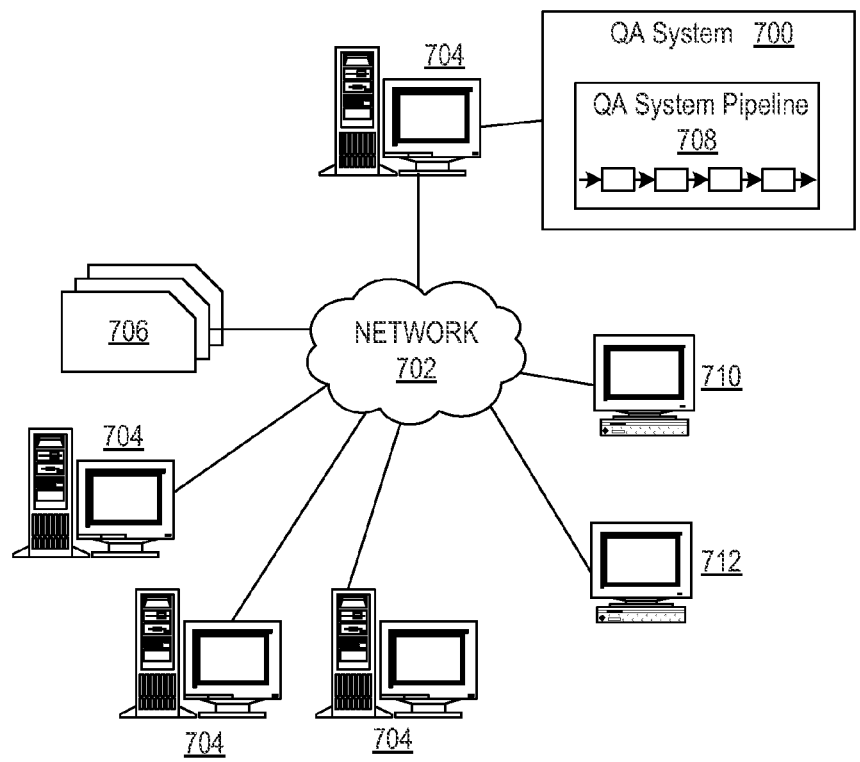
FIG. 7 is an example diagram of a QA system which may be used with the mechanisms of the present invention in accordance with one illustrative embodiment.
Figure 8:
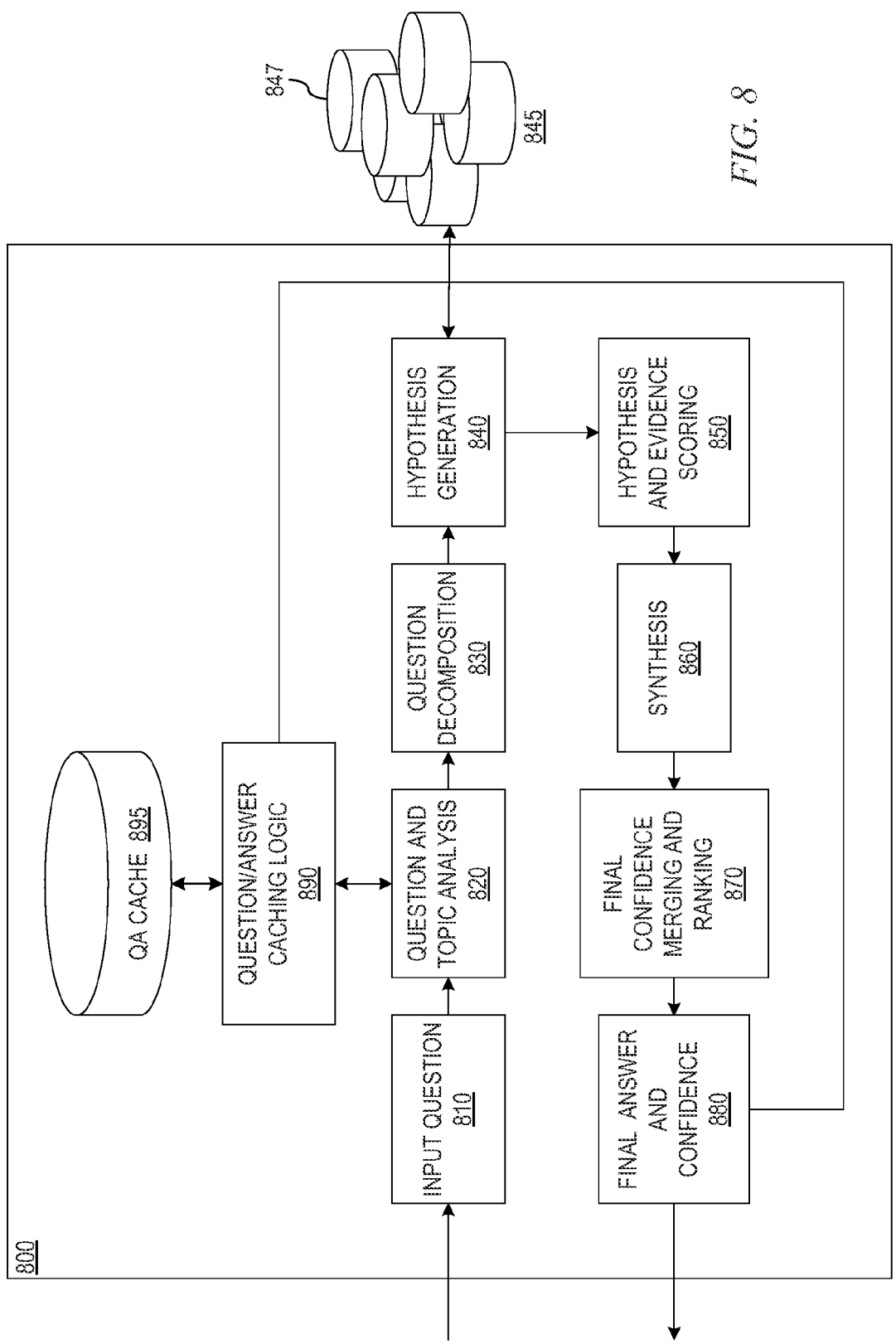
FIG. 8 illustrates a QA system pipeline for processing an input question in accordance with one illustrative embodiment.

As mentioned above, some embodiments of the present invention utilize a QA system to assist a user with a communication in a first communication session. While the illustrative embodiments are not limited to such, and any analysis system may be used including other types of natural language processing (NLP) systems, the QA system is used herein as an example implementation of an illustrative embodiment. FIGS. 7-8 are example diagrams of a QA system which may be used with the mechanisms of the present invention in accordance with one illustrative embodiment.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 7 depicts a schematic diagram of one illustrative embodiment of a question/answer creation (QA) system 700 in a computer network 702. One example of a question/answer generation which may be used in conjunction with the principles described herein is described in U.S. Patent Application Publication No. 2011/0125734, which is herein incorporated by reference in its entirety. The QA system 700 may be implemented on one or more computing devices 704 (comprising one or more processors and one or more memories, and potentially any other computing device elements generally known in the art including buses, storage devices, communication interfaces, and the like) connected to the computer network 702. The network 702 may include multiple computing devices 704 in communication with each other and with other devices or components via one or more wired and/or wireless data communication links, where each communication link may comprise one or more of wires, routers, switches, transmitters, receivers, or the like. The QA system 700 and network 702 may enable question/answer (QA) generation functionality for one or more QA system users via their respective computing devices 710-712. Other embodiments of the QA system 700 may be used with components, systems, sub-systems, and/or devices other than those that are depicted herein.

The QA system 700 may be configured to implement a QA system pipeline 708 that receive inputs from various sources. For example, the QA system 700 may receive input from the network 702, a corpus of electronic documents 706, QA system users, or other data and other possible sources of input. In one embodiment, some or all of the inputs to the QA system 700 may be routed through the network 702. The various computing devices 704 on the network 702 may include access points for content creators and QA system users. Some of the computing devices 704 may include devices for a database storing the corpus of data 706 (which is shown as a separate entity in FIG. 7 for illustrative purposes only). Portions of the corpus of data 706 may also be provided on one or more other network attached storage devices, in one or more databases, or other computing devices not explicitly shown in FIG. 7. The network 702 may include local network connections and remote connections in various embodiments, such that the QA system 700 may operate in environments of any size, including local and global, e.g., the Internet.

In one embodiment, the content creator creates content in a document of the corpus of data 706 for use as part of a corpus of data with the QA system 700. The document may include any file, text, article, or source of data for use in the QA system 700. QA system users may access the QA system 700 via a network connection or an Internet connection to the network 702, and may input questions to the QA system 700 that may be answered by the content in the corpus of data 706. In one embodiment, the questions may be formed using natural language. The QA system 700 may interpret the question and provide a response to the QA system user, e.g., QA system user 710, containing one or more answers to the question. In some embodiments, the QA system 700 may provide a response to users in a ranked list of candidate answers.

The QA system 700 implements a QA system pipeline 708 which comprises a plurality of stages for processing an input question, the corpus of data 706, and generating answers for the input question based on the processing of the corpus of data 706. The QA system pipeline 708 will be described in greater detail hereafter with regard to FIG. 8.

In some illustrative embodiments, the QA system 700 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 8 illustrates a QA system pipeline for processing an input question in accordance with one illustrative embodiment. The QA system pipeline of FIG. 8 may be implemented, for example, as QA system pipeline 708 of QA system 700 in FIG. 7. It should be appreciated that the stages of the QA system pipeline shown in FIG. 8 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 8 may be augmented, for example, in one or more of the stages to implement the improved mechanism of the illustrative embodiments described hereafter, additional stages may be provided to implement the improved mechanism, or separate logic from the pipeline 800 may be provided for interfacing with the pipeline 800 and implementing the improved functionality and operations of the illustrative embodiments As shown in FIG. 8, the QA system pipeline 800 comprises a plurality of stages 810-880 through which the QA system operates to analyze an input question and generate a final response. In an initial question input stage 810, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 820, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 830 to decompose the question into one or more queries that may be applied to the corpus of data/information 845 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpus of data/information 845. That is, these various sources themselves, collections of sources, and the like, may represent different corpora 847 within the corpus 845. There may be different corpora 847 defined for different collections of documents based on various criteria depending upon the particular implementation. For example, different corpora may be established for different topics, subject matter categories, sources of information, or the like. As one example, a first corpora may be associated with healthcare documents while a second corpora may be associated with financial documents. Alternatively, one corpora may be documents published by the U.S. Department of Energy while another corpora may be IBM Redbooks documents. Any collection of content having some similar attribute may be considered to be a corpora 847 within the corpus 845.

The queries may be applied to one or more databases storing information about the electronic texts, documents, articles, websites, and the like, that make up the corpus of data/information, e.g., the corpus of data 706 in FIG. 7. The queries being applied to the corpus of data/information at the hypothesis generation stage 840 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 540, to generate hypotheses for answering the input question. These hypotheses are also referred to herein as "candidate answers" for the input question. For any input question, at this stage 840, there may be hundreds of hypotheses or candidate answers generated that may need to be evaluated.

The QA system pipeline 800, in stage 850, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 860, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 870 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 880, a final answer and confidence score, or final set of candidate answers and confidence scores, may be generated and output to the submitter of the original input question.

The QA system of FIG. 8 may be used to provide additional information for assisting a user during a conversation being held as part of a communication session, as previously described above. The input question to the QA system, and the QA system pipeline, may be automatically generated from monitoring the communications being exchanged as part of a first communication session. This monitoring may be done automatically as a background process or may be in response to a user request for assistance via a graphical user interface. The QA system provides candidate answers and their corresponding confidence measures or scores back to an analysis engine for use in presenting assistance to the user via a graphical user interface provided through the communication system that is used to establish and maintain communication sessions.

Figure 9:
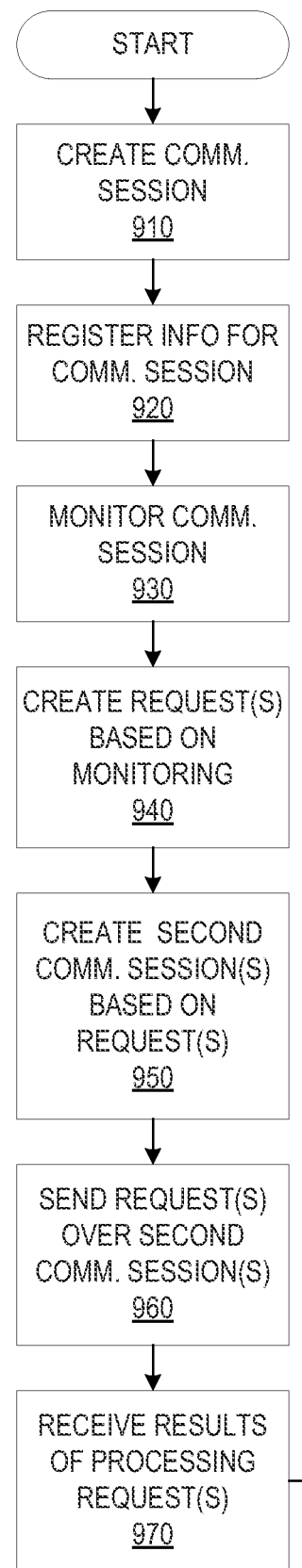
FIG. 9 is an example flowchart outlining an example operation for monitoring an analyzing a communication session in accordance with one illustrative embodiment.
Figure 9:
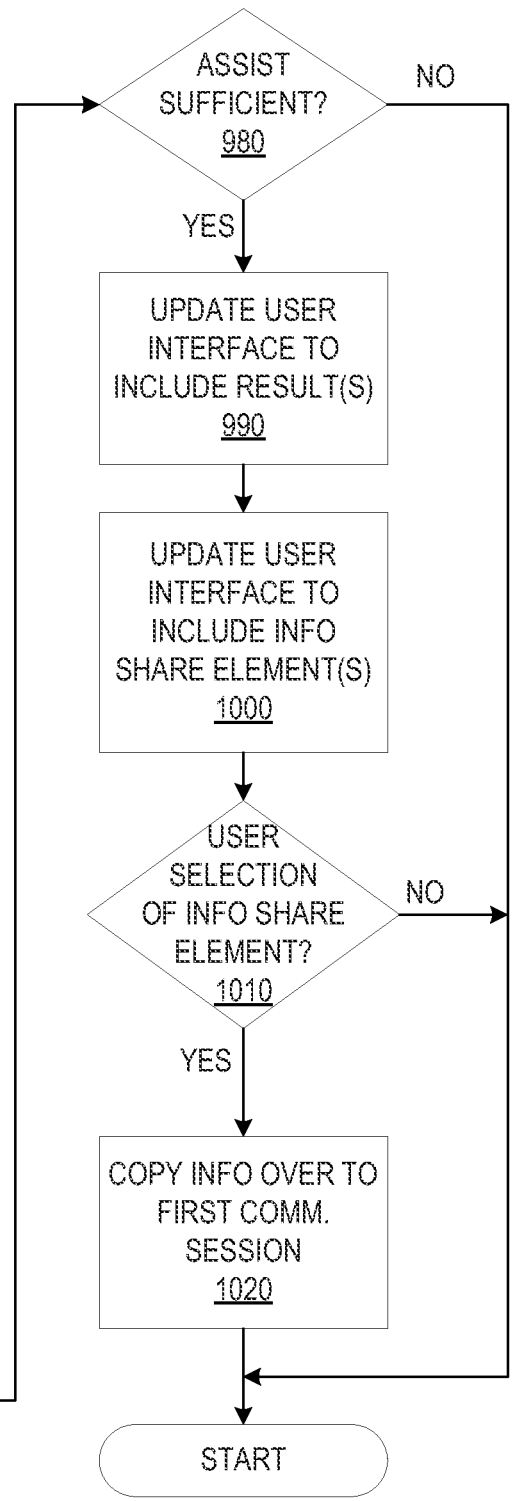

FIG. 9 is an example flowchart outlining an example operation for monitoring an analyzing a communication session in accordance with one illustrative embodiment. The embodiment outlined in FIG. 9 comprises an automatic background monitoring of communications in a communication session. However, as discussed above, it should be appreciated that this is but one example embodiment and other embodiments may be based on a user request to obtain assistance from an analysis engine as received via a user interface.

As shown in FIG. 9, the operation starts by establishing a first communication session between a first client computing device and a user computing device (step 910). Information regarding the first communication session is registered with an analysis engine (step 920) and the analysis engine begins monitoring communications exchanged as part of the first communication session (step 930). The monitoring of communications is made possible by copying the messages to the analysis engine which then performs natural language processing on the messages to extract features from the messages. The features are analyzed to determine a subject matter, focus, and other language elements of the message which may then be correlated with similar extracted features from other messages within the same communication session.

From this, an understanding of the purpose, content, and context of the communication is generated and used to create one or more requests for additional information to assist with the communications of the first communication session (step 940). These requests may take the form of queries to organizational data structures for information regarding subject matter experts, organizationally related persons, or the like, that may assist with the communications. These requests may also take the form of one or more questions, for submission to a QA system, that are automatically generated based on the features extracted from the communications and the specific context of the first communication session.

One or more second communication sessions are created via the communication system with one or more analysis systems (step 950). The requests for additional information are sent to the respective QA systems, search engines that search various data structures, and the like, for processing (step 960) and results of the processing of these requests are received from these various analysis systems via the one or more second communication sessions (step 970). The results are processed to determine if the results provide sufficiently useful assistance for the communications in the first communication session (step 980). If so, a user interface output to the user computing device is updated to include the results received from the analysis system(s) (step 990). If not, the user interface is not updated.

In addition, the user interface may be updated to include a user interface element to share the results between the first and second communication sessions (step 1000). If a user selects this user interface element (step 1010), then the results content presented in one portion of the user interface as part of the second communication session is automatically copied to the first communication session and displayed in a corresponding portion of the user interface (step 1020). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a first computing device comprising a processor and a memory, for sharing content of one communication session with another communication session, the method comprising:

establishing, by the first computing device, a first communication session between the first computing device and a second computing device, wherein the first computing device is operated by a first user and the second computing device is operated by a second user;

in response to establishing the first communication session, registering the first communication session with an analysis computing system that analyzes content of the first communication session to determine if additional information is available to assist with the first communication session, wherein the registration comprises providing context information for the first communication session to the analysis computing system;

establishing, by the first computing device, in response to content of the first communication session indicating subject matter for which additional information is desired by at least one of the first user or the second user, a second communication session between the first computing device and a question and answer (QA) system;

in response to an input by the first user to the first computing device requesting sharing of information of the first communication session with the second communication session, automatically copying, by the first computing device, a portion of content of the first communication session to the second communication session as an input question submitted to the QA system; and automatically establishing a third communication session with second computing device associated with a third user in response to the analysis computing system analyzing the content of the first communication session and, based on results of the analysis, identifies the third user as having an associated characteristic that corresponds to a feature of the content of the first communication session.

2. The method of claim 1, wherein the analysis computing system is a Natural Language Processing (NLP) computing system that performs natural language processing of the content of the first communication session.

3. The method of claim 1, wherein the analysis computing system further analyzes context information associated with the first communication session, wherein the context information comprises information identifying characteristics of the second user.

4. The method of claim 3, wherein the characteristics of the second user comprises at least one of information identifying a configuration of the second computing device used by the second user, account information associated with the user, or personal information about the second user.

5. The method of claim 1, wherein the characteristic comprises at least one of organizational relationship information indicating an organizational relationship between the third user and the first user or subject matter expertise information for the third user.

6. The method of claim 1, wherein the feature of the content of the first communication session comprises a feature indicative of a frustration level of the second user with the first communication session and the characteristic is a supervisory level of the third user relative to the first user.

7. The method of claim 1, wherein the feature of the content of the first communication session comprises a feature indicative of a subject matter of one or more communications of the first communication session, and wherein the characteristic associated with the third user is an indicator of a subject matter expertise of the third user.

8. The method of claim 1, further comprising:
  receiving, by the first computing device, results information generated by the QA system in response to receiving the input question;
  outputting, by the first computing device, the results information to the first user, wherein the results information comprises a candidate answer, generated by the QA system in response to the input question, which has at least a threshold, value level of confidence measure associated with the candidate answer; and
  automatically copying at least a portion of the results information from the second communication session into the first communication session such that the portion of the results information is output on the second computing device.

9. A computer program product comprising a non-transitory computer readable medium having a computer readable program stored therein, wherein the computer readable program, when executed on a first computing device, causes the first computing device to:
  establish a first communication session between the first computing device and a second computing device, wherein the first computing device is operated by a first user and the second computing device is operated by a second user;
  register, in response to establishing the first communication session, the first communication session with an analysis computing system that analyzes content of the first communication session to determine if additional information is available to assist with the first communication session, wherein the registration comprises providing context information for the first communication session to the analysis computing system;
  establish, in response to content of the first communication session indicating subject matter for which additional information is desired by at least one of the first user or the second user, a second communication session between the first computing device and a question and answer (QA) system;
  in response to an input by the first user to the first computing device requesting sharing of information of the first communication session with the second communication session, automatically copy a portion of content of the first communication session to the second communication session as an input question submitted to the QA system; and
  automatically establish a third communication session with a second computing device associated with a third user in response to the analysis computing system analyzing the content of the first communication session and, based on results of the analysis, identifies the third user as having an associated characteristic that corresponds to a feature of the content of the first communication session.

10. The computer program product of claim 9, wherein the analysis computing system is a Natural Language Processing (NLP) computing system that performs natural language processing of the content of the first communication session.

11. The computer program product of claim 9, wherein the analysis computing system further analyzes context information associated with the first communication session, wherein the context information comprises information identifying characteristics of the second user.

12. The computer program product of claim 11, wherein the characteristics of the second user comprises at least one of information identifying a configuration of the second computing device used by the second user, account information associated with the user, or personal information about the second user.

13. The computer program product of claim 9, wherein the characteristic comprises at least one of organizational relationship information indicating an organizational relationship between the third user and the first user or subject matter expertise information for the third user.

14. The computer program product of claim 9, wherein the feature of the content of the first communication session comprises a feature indicative of a frustration level of the second user with the first communication session and the characteristic is a supervisory level of the third user relative to the first user.

15. The computer program product of claim 9, wherein the feature of the content of the first communication session comprises, a feature indicative of a subject matter of one or more communications of the first communication session, and wherein the characteristic associated with the third user is an indicator of a subject matter expertise of the third user.

16. An apparatus comprising:
  a processor; and
  a memory coupled to the processor, wherein the memory comprises instructions which, when executed by the processor, cause the processor to:
  establish a first communication session between the apparatus and a first computing device, wherein the apparatus is operated by a first user and the first computing device is operated by a second user;
  register, in response to establishing the first communication session, the first communication session with an analysis computing system that analyzes content of the first communication session to determine if additional information is available to assist with the first communication session, wherein the registration comprises providing context information for the first communication session to the analysis computing system;
  establish, in response to content of the first communication session indicating subject matter for which additional information is desired by at least one of the first user or the second user, a second communication session between the apparatus and a question and answer (QA) system;
  in response to an input by the first user to the apparatus requesting sharing of information of the first communication session with the second communication session, automatically copy a portion of content of the first communication session to the second communication session as an input question submitted to the QA system; and
  automatically establish a third communication session with a second computing device associated with a third user in response to the analysis computing system analyzing the content of the first communication session and, based on results of the analysis, identifies the third user as having an associated characteristic that corresponds to a feature of the content of the first communication session.

* * * * *